Sept. 18, 1951    J. BRISKIN ET AL    2,568,539
FILM STABILIZER FOR SOUND MOTION-PICTURE PROJECTORS
Filed Nov. 20, 1947    2 Sheets-Sheet 1
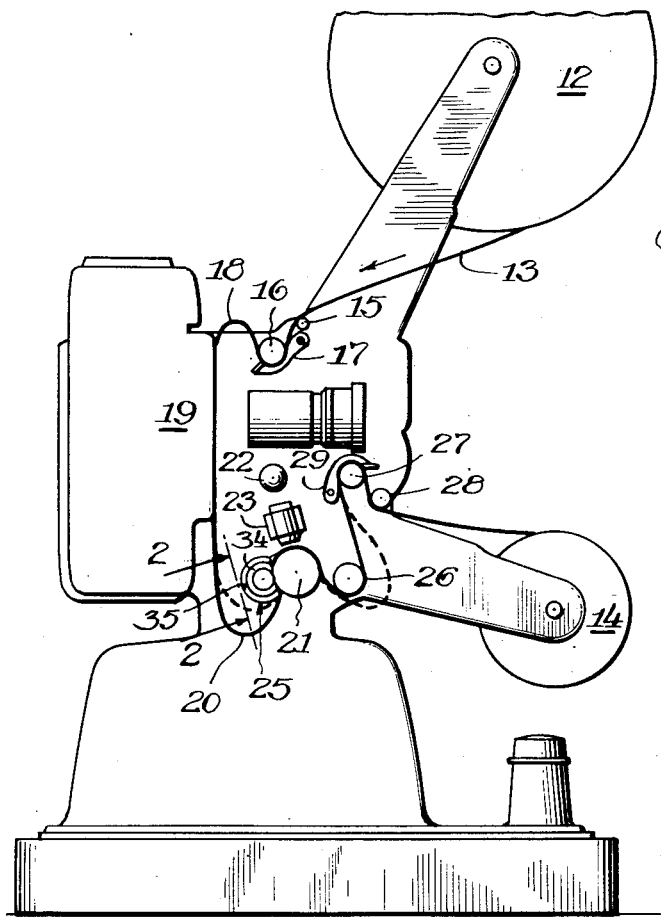
Fig.1
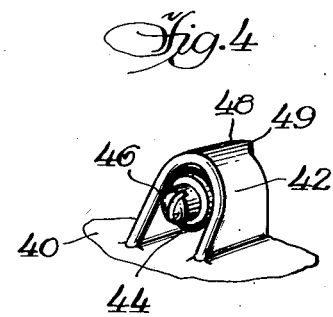
Fig.4
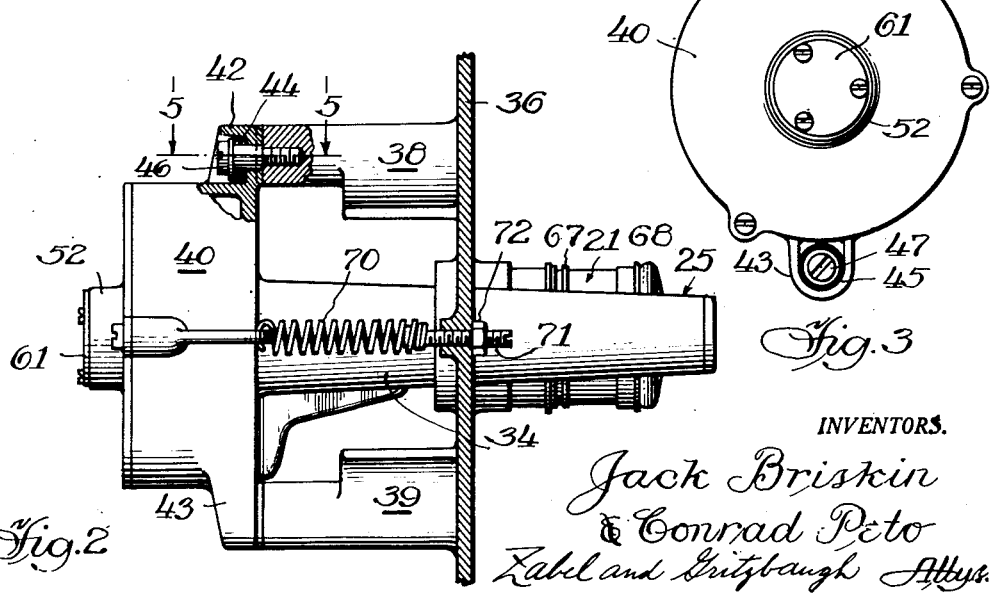
Fig.3
Fig.2
INVENTORS.
Jack Briskin
& Conrad Peto
Zabel and Gritzbaugh Attys.

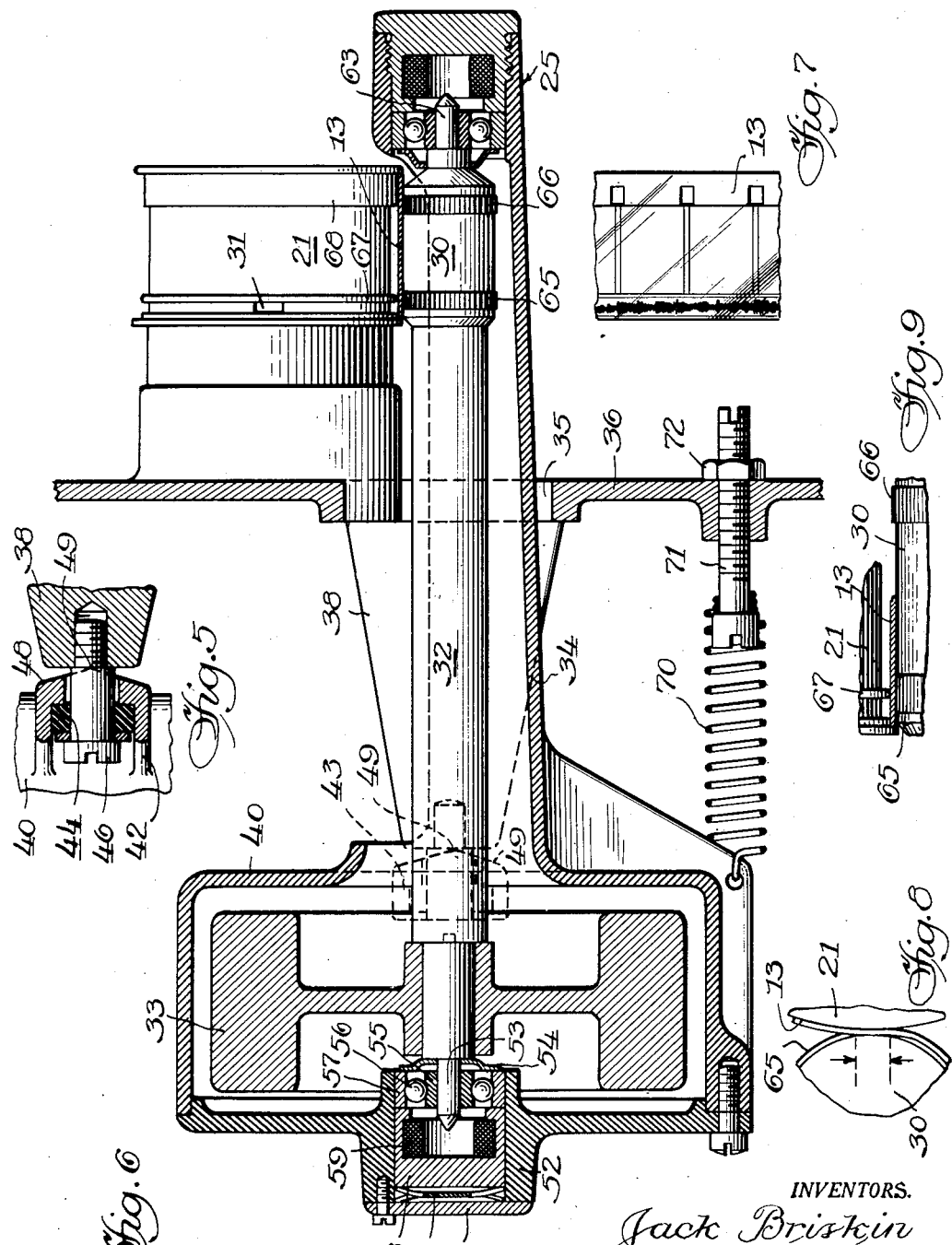

Patented Sept. 18, 1951

2,568,539

UNITED STATES PATENT OFFICE 2,568,539

FILM STABILIZER FOR SOUND MOTION-PICTURE PROJECTORS

Jack Briskin and Conrad Peto, Chicago, Ill., assignors to Revere Camera Company, Chicago, Ill., a corporation of Delaware Application November 20, 1947, Serial No. 787,188

4 Claims. (Cl. 271—2.3)

This invention relates to sound motion picture projectors, and more particularly to a stabilizer adapted to be used therewith for achieving constant velocity film travel at the point where the sound track of the film is scanned.

One object of the invention is to provide a stabilizer that cooperates with the film to oppose and moderate fluctuations occurring in the velocity of film travel. As is well known, mechanical film driving mechanisms are more or less incapable of uniform, unvarying operation. Velocity fluctuations are introduced through motor speed variations due to line and load variations. Also, the various mechanical elements making up the power train such as bearings, shafts, gears and the film itself all are somewhat responsible for producing fluctuations in the velocity of film travel. These fluctuations, if not substantially eliminated, introduce distortion in the sound pick-up system to thus substantially affect the sound reproduction characteristics of the projector. The present stabilizer concerns itself with means for eliminating these objectionable film velocity fluctuations.

Another object is to provide a stabilizer that greatly simplifies the operation of properly threading the film through the projector. In prior projectors of this general character, it has been necessary to thread the film in such a manner as to eliminate all film slack between the various reels, driving sprockets, idling pulleys, etc. This makes the threading operation somewhat critical, and it introduces difficulties for the amateur operators that ordinarily use this type of equipment. The invention eliminates the critical aspects of film threading by providing that more or less film slack may be present without interfering with the proper operation of the projector.

Still another object is to provide a film positioning device adapted to insure proper relationship between the film and the sound head upon which the sound track of the film is scanned.

Another object contemplates a stabilizer that is selectively movable to facilitate film threading through the stabilizer itself. Also, the stabilizer is self-adjusting so as to compensate for variations in film thickness that often are present.

Other objects and advantages of the invention will be apparent as the description proceeds, reference being had to the accompanying drawings wherein one form of the invention is shown. It is to be understood that the description and drawings are illustrative only, and are not to be taken as limiting the invention except insofar as it is limited by the claims.

In the drawings:

Fig. 1 is a side elevational view of an improved projector showing various film guiding elements in simplified form;

Fig. 2 is a view on line 2—2 of Fig. 1, partly in section, showing the stabilizer of the invention;

Fig. 3 is an end view, looking from the left of Fig. 2, of a portion of the stabilizer;

Fig. 4 is a perspective view of a pivotal coupling that may be used with the invention;

Fig. 5 is a sectional view on 5—5 of Fig. 2;

Fig. 6 is a view partly in section of our stabilizer;

Fig. 7 is a fragmentary plane view of the film used with the invention; and

Figs. 8 and 9 show the manner in which the film engages certain elements of the stabilizer.

Referring to the drawings, Fig. 1 shows in somewhat simplified form a sound motion picture projector embodying the present invention. The projector has an upper reel 12 containing film 13 that threads through the apparatus and is wound on lower reel 14 during projector operation. In the usual case, lower reel 14 is motor driven while upper reel 12 is an idler.

Film 13 passes over idler pulley 15 and around drive sprocket 16, the film being held in engagement with sprocket 16 by means of retainer 17. The film, following a free loop 18, passes through the optical system of the projector, generally indicated at 19, where the film is intermittently advanced in any well known manner.

After passing through optical system 19, the film may be freely looped as shown at 20 after which it passes around the outside of sound head 21 where the sound scanning takes place. The sound head 21 may take the form of a cylindrical member having a small, light admitting aperture in the cylinder wall. A photoelectric cell (not shown) is mounted within the cylinder, the photosensitive electrode of the cell being in alignment with the aperture. A light source 22 and a lens system 23 are so aligned with the aperture and the photosensitive electrode that suitable illumination is provided for cooperation with the sound track of the film. The sound head 21 and its associated instrumentalities are so disposed that the sound track of the film passes over the light admitting aperture.

A structure generally shown at 25 bears against film 13 to hold the film against sound head 21 and, as will be seen, to exert a stabilizing influence over the velocity of film travel, thus insuring constant film velocity with respect to the sound head. The structure 25 also insures proper relationship between film 13 and sound head 21.

Following sound head 21, film 13 passes around idler pulley 26, driving sprocket 27, idler pulley 28 and thence to lower reel 14. A retainer 29 insures proper film relationship with driving sprocket 27.

Certain dotted lines appearing in Fig. 1 show alternative positions that might be assumed by film 13 in the vicinity of sound head 21, thus demonstrating the non-critical aspect of the invention insofar as threading the film is concerned. It will be understood that the loops indicated will tend to vary in size upon starting and stopping of the projector as compared to their size during projector operation. The variations permitted in the size of these loops tend to insure trouble-free operation of the projector despite projector starting and stopping during the showing of a single reel of film.

Referring now to the other figures in the drawings, our improved stabilizer includes a rotatable drum 30 (at the right in Fig. 6) disposed in effective relationship with sound head 21. The above mentioned, light admitting aperture in sound head 21 is shown at 31 in Fig. 6. The aperture desirably is sealed by glass so that the enclosed photoelectric cell is isolated from the sometimes dust laden atmosphere.

The rotatable drum 30 may form one end of a shaft 32 as illustrated. An inertia member such as flywheel 33 is carried at the other end of shaft 32. Drum 30, shaft 32 and flywheel 33 are substantially enclosed by a housing 34 that extends transversely of the projector through an opening 35 in the projector side 36.

A pair of vertically spaced brackets 38 and 39 (Fig. 2) extend inwardly of the projector from side 36. The flywheel enclosing portion 40 of housing 34 is provided with top and bottom hollow lugs 42 and 43 (Figs. 2 and 3) that are in alignment respectively with the free ends of brackets 38 and 39. The hollow lugs 42 and 43 have countersunk portions that receive resilient members 44 and 45. These members may take the form of natural or synthetic rubber washers, and they engage the heads 46 and 47 of bolts that extend through openings in lugs 42 and 43 into threaded relation with the free ends of brackets 38 and 39.

The bracket engaging face 48 (Fig. 5) of lug 42 tapers to a central ridge 49 that bears against bracket 38 as clearly shown in Fig. 5. The openings in lugs 42 and 43 are somewhat larger than the bolts passing therethrough, and therefore the coupling just described provides a pivotal relationship between the portion 40 of housing 34 and the brackets 38 and 39 associated with the projector side. The resilient members 44 and 45 in the lugs cooperate with the bolts, the enlarged lug openings and the ridge 49 to make possible this pivotal coupling.

Referring particularly to Fig. 6, the shaft 32 is mounted for free and easy rotation within housing 34. The left end of the portion 40 of housing 34 has a boss 52 that contains bearing elements for rotatably mounting reduced end 53 of shaft 32. These bearing elements include a dust shield 54, an inner race 55, ball bearings 56, an outer race 57, a bearing loading plunger 58, an oil washer 59 and a loading spring 60. A plate 61 maintains the above mentioned bearing elements in proper position within boss 52.

The other end of shaft 32 has a reduced portion 63 that is rotatably mounted in bearing elements that are substantially similar to the bearing elements above enumerated.

Referring again to the film engaging drum 30, the surface of the drum is provided with two spaced bands 65 and 66 of friction material such as natural or synthetic rubber. These bands on drum 30 are in alignment with ribs 67 and 68 provided on the surface of sound head 21.

The film 13 passes between sound head 21 and the drum 30 as best shown in Figs. 6 and 8. The film at this point is being advanced at a more or less uniform velocity by driving sprocket 27 (Fig. 1), and the film, through the two-way frictional relationship with drum 30 provided by bands 65 and 66, causes corresponding rotation of shaft 32 and associated flywheel 33.

In order that proper pressure is exerted between drum 30, film 13 and sound head 21 to insure the desired two-way frictional drive relationship between film 13 and drum 30, we provide a spring 70 (Figs. 2 and 6) extending between the pivoted flywheel enclosing portion 40 of housing 34 and the fixed side 36 of the projector. Means permitting adjustment of spring 70 is provided by associated bolt 71 that is threaded through projector side 36, the bolt 71 having a locking nut 72 as shown. Adjustment of bolt 71 controls the tension of spring 70 to vary the pressure exerted by drum 30 against film 13, thus to permit adjustment to insure proper operation of the stabilizer. Also, spring 70 permits selective separation of drum 30 from sound head 21 so that the film may be readily inserted or removed, the spring thereafter automatically restoring the stabilizer to condition for stabilizer operation.

Referring to Figs. 8 and 9, it will be seen that the bands 65 and 66 of friction material are somewhat deformed or flattened out upon contact with film 13. Thus areas of contact are provided to insure a substantially positive frictional driving relationship between the film and drum 30. Therefore, the lineal velocity of film 13 is translated into corresponding angular velocity of drum 30, shaft 32 and the associated flywheel inertia member 33.

During projector operation, the inertia member 33 develops an angular velocity corresponding generally to the average lineal velocity of film 13. Then as fluctuations occur in the projector that vary the speed of the film driving sprocket 27 to consequently affect the lineal velocity of film 13, the rotating inertia member tends to oppose and moderate the fluctuations, thus maintaining the velocity of film travel at a comparatively uniform rate. It will be understood that the inertia member is capable of either increasing or decreasing the film velocity depending upon the sense of the fluctuations in the mechanical film driving system. The substantially constant film velocity thus provided is, of course, reflected in improved performance of the sound reproduction characteristics of the projector.

From the above description it is thought that the construction and advantages of this invention will be readily apparent to those skilled in the art. Various changes and modifications may be made without departing from the spirit or losing the advantages of the invention.

Having thus described the invention, what we claim as new and desire to secure by Letters Patent is:

1. In a sound motion picture projector having a stationary sound head, a stabilizer including a flywheel and a film contacting drum connected thereto, said drum having a friction surface for engaging the film on said sound head in a two-way driving relationship, a supporting structure for said flywheel and drum having bearing means permitting free rotation of said flywheel and drum, pivotal means connecting said supporting structure to the body of the projector at a point remote from said drum, and means normally urging said drum into driving relationship with the film on said sound head.

2. A film velocity stabilizer for a sound motion picture projector including a sound head about a portion of which the film passes during scanning, a rotatable drum adapted to engage the film on said sound head in a two-way driving relationship, pivotal means connecting said drum with the projector, yieldable means urging said drum against the film, and an inertia member driven by said drum and operable to oppose and moderate fluctuations in film velocity.

3. In a sound motion picture projector having a stationary sound head: a stabilizer for insuring substantially constant velocity film travel at the point on the sound head where the sound track is scanned, said stabilizer including a shaft and an inertia member driven thereby, a supporting structure in which said shaft is rotatably mounted, a drum carried by said shaft, said drum having a friction surface for engagement with the moving film as the latter travels over said sound head, pivoted means connecting said supporting structure at a point remote from said drum to the body of the projector whereby the axis of said drum may be pivoted toward or away from said sound head, and yieldable pressure means normally urging said drum toward said sound head to maintain a two-way friction driving relation between said drum and the film during projector operation.

4. A film velocity stabilizer for a sound motion picture projector including a sound head about a portion of which the film passes during scanning, means remote from said sound head for driving said film at a more or less uniform velocity, a rotatable drum adapted to engage the film on said sound head in a frictional two-way driving relationship, pivotal means connecting said drum with said projector, yieldable pressure means urging said drum against the film and an inertia member driven by said drum to oppose and moderate fluctuations in film velocity.

JACK BRISKIN.
CONRAD PETO.

REFERENCES CITED

The following references are of record in the file of this patent:

UNITED STATES PATENTS

| Number | Name | Date |
|---|---|---|
| 1,801,472 | Whitson | Apr. 21, 1931 |
| 1,998,931 | Kellogg | Apr. 23, 1935 |
| 2,026,625 | Geyer | Jan. 7, 1936 |
| 2,092,185 | Ross et al. | Sept. 7, 1937 |
| 2,108,398 | Allen | Feb. 15, 1938 |
| 2,183,440 | Barnicoat | Dec. 12, 1939 |
| 2,204,887 | Dewan | June 18, 1940 |
| 2,258,759 | Heacock | Oct. 14, 1941 |
| 2,261,410 | Perez | Nov. 4, 1941 |
| 2,351,725 | Wack | June 20, 1944 |

FOREIGN PATENTS

| Number | Country | Date |
|---|---|---|
| 420,223 | Great Britain | Nov. 28, 1934 |